(12) United States Patent
Le Maguet

(10) Patent No.: US 6,650,706 B2
(45) Date of Patent: Nov. 18, 2003

(54) FREQUENTIAL-BASED DATA MODIFYING METHOD AND DEVICE

(75) Inventor: Yann Le Maguet, Paris (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 331 days.

(21) Appl. No.: 09/761,247

(22) Filed: Jan. 16, 2001

(65) Prior Publication Data

US 2002/0009150 A1 Jan. 24, 2002

(30) Foreign Application Priority Data

Jan. 14, 2000 (EP) ............................................ 00400101
Apr. 18, 2000 (EP) ............................................ 00401076

(51) Int. Cl.[7] .................................................. H04N 7/12
(52) U.S. Cl. .................................................. 375/240.12
(58) Field of Search ........................... 375/240, 240.01, 375/240.12–240.16, 240.18, 240.2, 240.24, 240.25, 240.26, 240.27; 348/402.1, 441; H04N 7/12

(56) References Cited

U.S. PATENT DOCUMENTS 5,544,266 A * 8/1996 Koppelmans et al. .... 348/402.1
5,589,993 A * 12/1996 Naimpally .............. 375/240.25
5,623,312 A * 4/1997 Yan et al. ............... 375/240.16
5,635,985 A * 6/1997 Boyce et al. ........... 375/240.15
5,729,293 A * 3/1998 Keesman ................ 375/240.15
6,181,743 B1 * 1/2001 Bailleul ...................... 375/240
6,493,389 B1 * 12/2002 Bailleul .................. 375/240.12

FOREIGN PATENT DOCUMENTS

WO        9900235        2/1999

OTHER PUBLICATIONS

Leesman G. et al, "Tanscoding of MPEG Bitstreams"Signal Processing, Image Communication, NL, Elsevier Science Publ, Amsterdam, Sep. 1996 (Abstract), pp. 481–500.

* cited by examiner

Primary Examiner—Richard Lee

(57) ABSTRACT

A method of modifying data in an encoded data signal 128 corresponding to successive pictures divided into sub-pictures, for providing an output modified data signal 129. In particular, this model can be used for the insertion of an additional data signal 130 into a compressed video data signal 128. The proposed arrangements/diagrams according to the method are based on a transcoder arrangement including at least partial decoding and partial re-encoding. This method leads to a cost-effective solution compared with the prior art comprising a minimum number of functional DCT/IDCT sub-steps, taking advantage of simplifications and combinations between different sub-steps.

4 Claims, 7 Drawing Sheets

FREQUENTIAL-BASED DATA MODIFYING METHOD AND DEVICE

FIELD OF THE INVENTION

The present invention relates to a method of modifying data in an encoded data signal, comprising at least:
- a decoding step for decoding said encoded data signal and providing a decoded data signal,
- a re-encoding step performed on a modified data signal.

The invention also relates to video processing devices for carrying out said method. This invention may be used, for instance, when a broadcaster wants to introduce additional data into a sequence of coded pictures. This invention finds applications not just in the field of MPEG-2 compression, but more generally in any digital video data compression system.

BACKGROUND OF THE INVENTION

Modifying data in an encoded data signal has become a vital function in studio editing environments. A possible solution has been proposed in the international patent application WO 99/51033 (PHF98546). This patent application describes a method and its corresponding device for modifying data in an encoded data signal. This method allows an additional data signal insertion, e.g. a logo insertion, in an MPEG-2 bitstream by means of bit rate transcoding. Logo insertion comes as an extension of the bit rate transcoder. The corresponding diagram, depicted in FIG. 1, comprises a transcoding module 101 and a logo addition branch 102. The general outline of the transcoding module 101, well known to a person skilled in the art, comprises:

- a partial decoding branch 119 for receiving the input signal 128 and providing a decoded data signal Error_I'(n), also called error residue. This branch comprises in series a variable length decoding 107, an inverse quantization 108 providing a decoded data signal Error_I(n) in the frequential domain, and an inverse discrete cosine transform (IDCT) 109 for providing a decoded data signal Error_I'(n) in the pixel domain.
- a re-encoding branch 121 for providing an output signal 129 and generating a coding error. Said re-encoding branch, acting on the modified data signal A'(n) for providing said output signal 129, comprises in series a discrete cosine transform (DCT) 110, a quantization 111, a variable length coding 112 followed by a buffer 113, and regulation means 114 ensuring a constant picture quality of the output signal 129. A local decoding is also performed inside said re-encoding branch. It comprises in series an inverse quantization 115 followed by an inverse discrete cosine transform 116. A subtracting sub-step is performed for providing said coding error resulting from the difference between the output signal of said sub-step 116 and said signal A'(n).
- an intermediate branch 120 comprising a motion compensation 105 using motion vectors V(n) of the input signal, its associated memory 106 storing a previous signal, and a second subtracter 124. This branch, also called prediction loop, avoids the quality drift in the output signal 129 by subtracting the motion-compensated coding error from said decoded data signal, by means of subtracting sub-step 124.

The logo addition branch 102 is implemented through to the addition of a pixel-based residual signal to the decoded signal Error_I'(n) by means of the adding sub-step 122. This branch provides a pixel-based residual signal resulting from the subtraction between an additional data signal Logo(n) referenced 130 and a motion-compensated logo predicted signal PRED(Logo(n−1), V(n)) referenced 127, obtained by means of the motion compensation sub-step 103 and based on reference pictures containing logo previously stored in memory 104 with the use of the same vectors V(n) as the main input signal.

In the prior art diagram depicted in FIG. 1, two inverse discrete cosine transforms designated as 109 and 116 are performed, as well as one discrete cosine transform designated as 110. The first inverse discrete cosine transform 109 is applied to dequantized frequential coefficients obtained after the inverse quantization 108. Said sub-step 109 allows to access in the pixel domain to access a pixel-based error residue relative to the input signal 128 and thus to perform the data addition in the pixel domain by means of the adding sub-step 122. The pixel-based signal resulting from this addition, after subtraction of the drift correction signal generated by 105, is then re-encoded by processing means. To this end, the discrete cosine transform 110 is dedicated to convert pixel-based data into frequential data, said frequential data being afterwards quantized and entropy-coded in order to generate the output signal 129. A second inverse discrete cosine transform 116 is also done in the re-encoding branch so that the motion compensation 105 is performed on pixel-based data. Such DCT/IDCT are block-based processes performed on 8*8 pixel blocks defining the respective data content of each picture in the pixel/frequential domain. Dealing with the so-called widespread 4:2:0-625 or 4:2:2-625 video formats, each picture is defined by a large number of 8*8 blocks whose DCT/IDCT processes lead to a dramatically high CPU load. Indeed, such processes necessitating a huge quantity of addition-multiplication steps of high resolution, they can only be done with powerful digital signal processors, thus excluding the definition of relatively low-cost devices or products. This prior art solution then remains expensive in terms of the CPU load, which also results in a lack of flexibility in its hardware implementation.

SUMMARY OF THE INVENTION

It is an object of the invention to provide a method of modifying data in an encoded data signal, derived from the prior art, which imposes a lesser burden on central processing units (CPU).

In a first application, the method of modifying data according to the invention is characterized in that it comprises:
- a conversion step for providing a frequential residual signal resulting from the frequential conversion of said pixel-based residual signal, said frequential residual signal being added to said decoded data signal,
- a sub-step for adding said frequential residual signal to said decoded data signal so as to provide said modified data signal.

In a second application, the method of modifying data according to the invention, comprising an intermediate step providing a motion-compensated signal from said coding error, is characterized in that said motion-compensated signal is subtracted from said modified data signal before said re-encoding step.

In a third application, the method of modifying data according to the invention, comprising a residual signal resulting from the difference between an additional data signal and its predicted version, is characterized in that it comprises sub-steps for inserting said additional data signal into said intermediate step.

In a fourth application, the method of modifying data according to the invention is characterized in that it comprises a sub-step for adding said additional data signal to said modified data signal before said re-encoding step.

The corresponding diagrams, depicted in FIG. 2 to FIG. 7, respectively, are based on data addition of the additional data signal 130 to the decoded data signal relative to the input data signal or to a signal situated in the transcoder drift correction loop by means of said adding or subtracting sub-steps.

According to the invention, compared with the prior art solution, CPU-consuming DCT/IDCT sub-steps are replaced with DCT/IDCT sub-steps involving a limited load on the CPU, in return for which the structure of the data insertion is modified, such simplifications being possible in that advantage is taking of combinations between different sub-steps and in using their own properties, such as the linearity of the motion compensation or the distributivity of DCT as compared with addition. The invention thus comprises a minimum number of functional sub-steps, which results in a cost-effective solution.

Another object of the invention is to propose devices for implementing the above-mentioned methods.

To this end, in a first implementation, the invention relates to a transcoding device for adding data to an encoded data signal, characterized in that it comprises:

conversion means for providing a frequential residual signal resulting from the frequential conversion of said pixel-based residual signal, said frequential residual signal being added to said decoded data signal, means for adding said frequential residual signal to said decoded data signal so as to provide said modified data signal.

In a second implementation, the invention relates to a transcoding device for adding data to an encoded data signal characterized in that it comprises data insertion means for inserting a modifying data signal into said intermediary branch.

In a third implementation, the invention relates to a transcoding device for adding data to an encoded data signal, characterized in that it comprises means for adding an additional data signal to said modified data signal before said re-encoding.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

As was stated above, the present invention aims at reducing the cost of the prior art method for modifying data in an encoded data signal. Such an invention is well adapted to the case of MPEG-2 coded video signals as input signal, but it will be apparent to a person skilled in the art that such a method is applicable to any coded signal that has been encoded with a block-based compression method such as, for example, the one described in MPEG-4, H.261 or H.263 standards. In the following, the invention will be detailed assuming that encoded video signals comply with the MPEG-2 international video standard (Moving Pictures Experts Group, ISO/IEC 13818-2).

Figure 1:
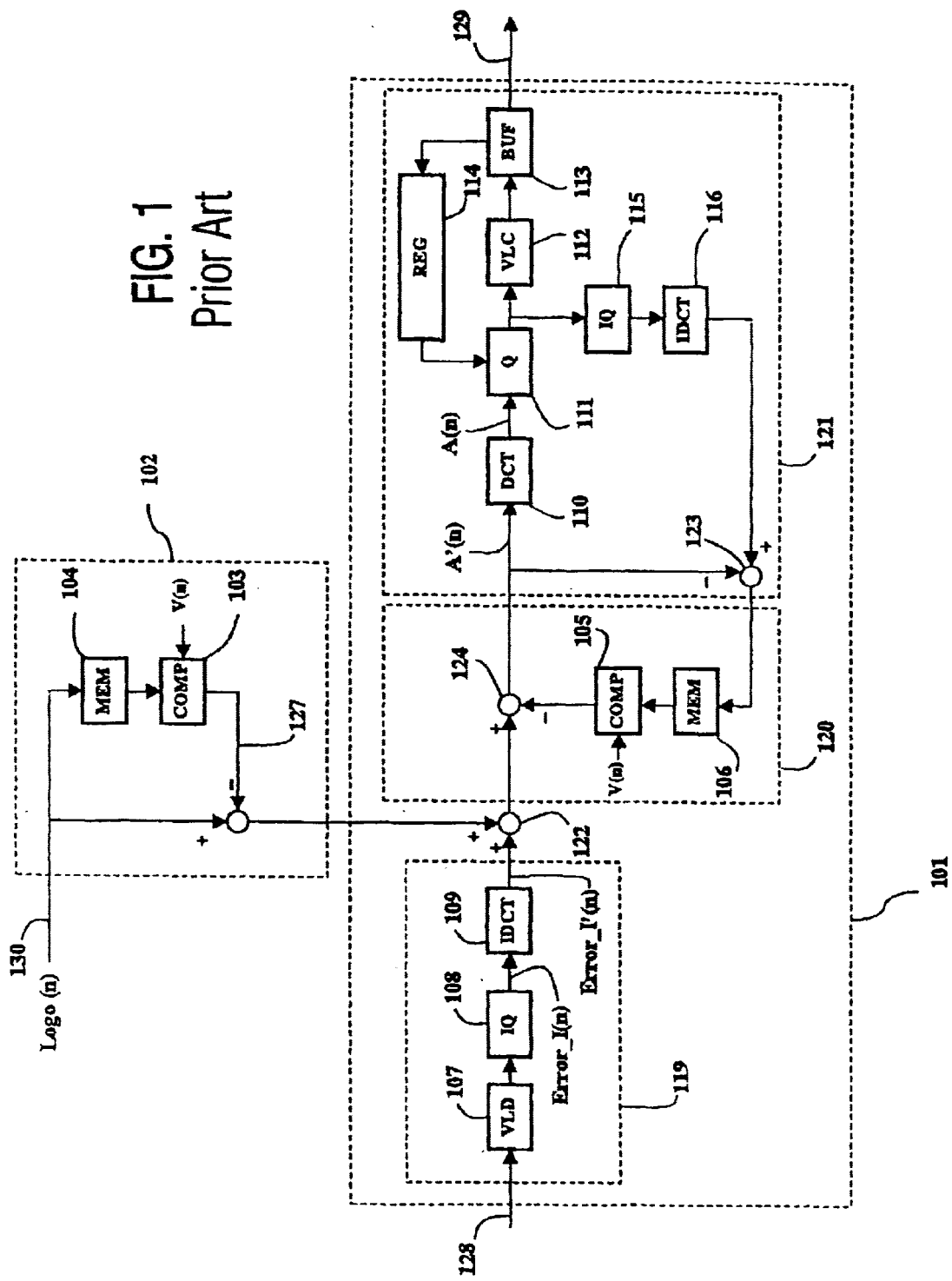
FIG. 1 illustrates the outline, as known in the prior art, of a transcoder with its logo addition branch.
Figure 2:
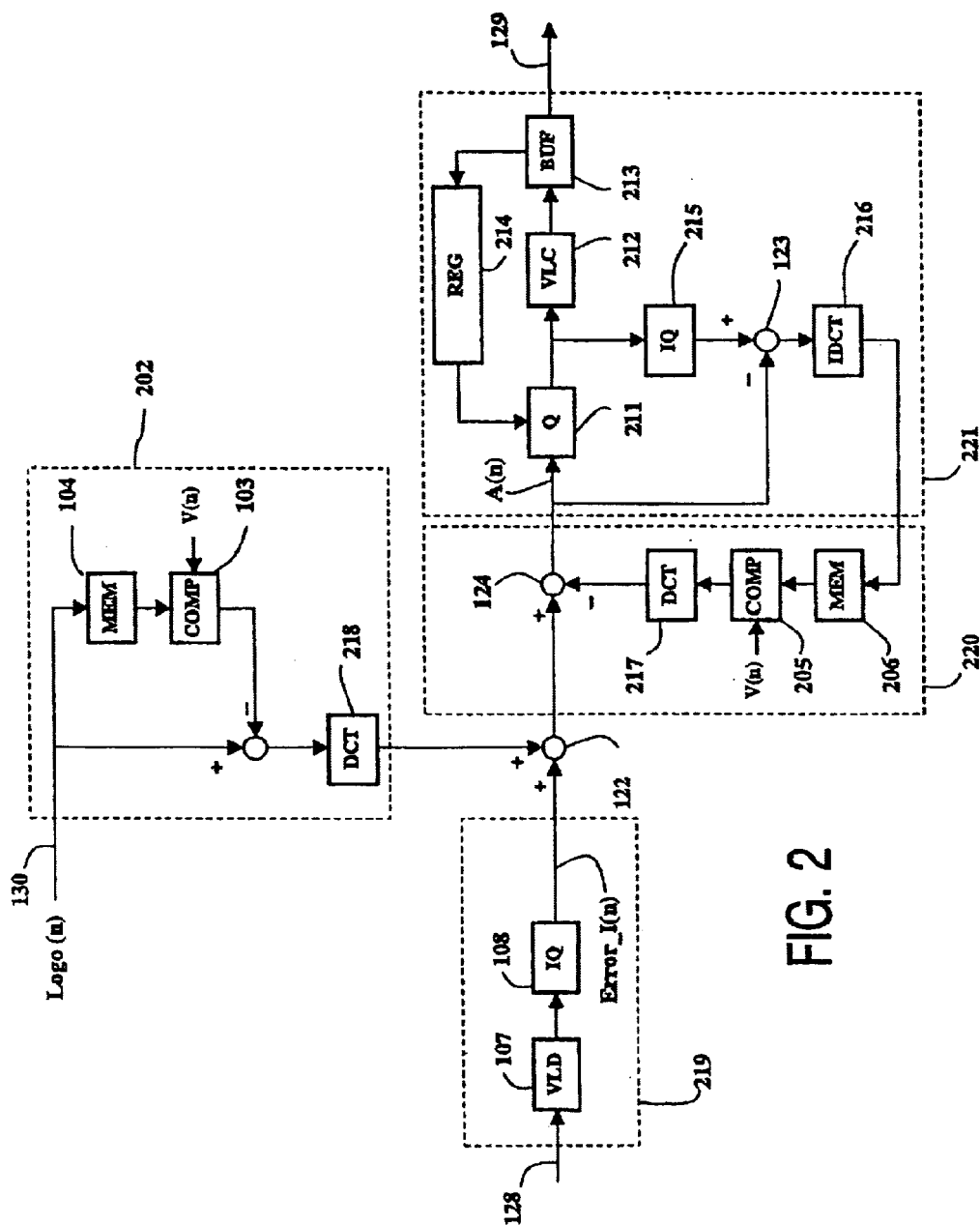
FIG. 2 illustrates a first embodiment of the technical solution according to the present invention.

FIG. 2 is a diagram of the first data insertion of an additional data signal Logo(n) referenced 130 into an encoded data signal 128. It is derived from the prior art diagram depicted in FIG. 1, using the properties of DCT and IDCT operations. Indeed, data insertion in the pixel domain as depicted in FIG. 1 can be transformed so as to insert data in the frequential domain while reducing the cost of the algorithm in view of a hardware implementation.

The following notations will be adopted for the demonstration:

V(n): vectors of picture number n,

Error_I(n): error residue of input picture number n in the frequential domain,

Error_I'(n): error residue of input picture number n in the pixel domain,

MEM1(n): picture number n stored in the frame memory 106,

PRED(X(n), V(n+1)): motion compensation of signal X(n) using vectors V(n+1). It corresponds to a predicted version of signal X(n+1), DCT(X(n)): discrete cosine transform of signal X(n), IDCT(X(n)): inverse discrete cosine transform of signal X(n).

Starting from the prior art, it can be written:
1) A(n)=DCT(A'(n))
2) A(n)=DCT(Error_I'(n)+Logo(n)−PRED(Logo(n−1), V(n))−PRED(MEM1(n−1), V(n)))

Using the property of distributivity of DCT as compared with addition:
3) A(n)=DCT(Error_I'(n))+DCT(Logo(n)−PRED(Logo(n−1), V(n)))−DCT(PRED(MEM1(n−1), V(n)))

Considering the linearity of DCT and IDCT operations, and the fact that applying a DCT to a signal which has passed through an IDCT equals the unity transfer:
4) DCT(IDCT(X(n)))=X(n) with X(n) defining a digital video signal and
5) Error_I'(n)=IDCT(Error_I(n))

Using relations 0 and 0, A(n) becomes:
6) A(n)=Error_I(n)+DCT(Logo(n)−PRED(Logo(n−1), V(n)))−DCT(PRED(MEM1(n−1), V(n)))

This relation 6) can thus be implemented according to the arrangement of FIG. 2. Such an arrangement has the same structure as the one of the prior art in the sense that it also comprises a partial decoding branch 219, a re-encoding branch 221, an intermediate branch 220, a data addition branch 202, all linked in the same manner but composed of different sub-steps so that new data insertion is performed in the frequential domain. The partial decoding branch 219, providing a decoded data signal, comprises a variable length decoding sub-step 107 followed by the inverse quantization sub-step 108. The re-encoding branch 221, acting on a modified data signal, comprises in series a quantization sub-step 211, a variable length coding sub-step 212, and buffer regulation means 213–214. It also comprises an inverse quantization sub-step 215 receiving the output signal of sub-step 211, a subtracting sub-step 123 delivering the difference between two signals in the frequential domain, the first one corresponding to the output of sub-step 215 and the second one corresponding to the output of sub-step 124, and an inverse discrete cosine transform 216 receiving the output signal of said sub-step 123 and delivering a coding error. The intermediate branch 220 comprises in series a memory defined by sub-step 206 and storing a previous picture number MEM2(n−1), a motion compensation sub-step 205 performed on the contents of 206 and delivering a pixel-based motion-compensated signal PRED(MEM2(n−1), V(n)), also called predicted signal, a discrete cosine transform 217 ensuring a frequential conversion of said pixel-based motion-compensated signal, and a subtracting sub-step 124 deriving said modified data signal from the difference between said decoded data signal and the output signal of sub-step 217. The intermediate branch 220 avoids a quality drift in time by subtracting from said decoded data signal a motion-compensated signal obtained from said coding error. The data addition branch 202, providing a frequential residual signal to be added to the output signal of the partial decoding branch by means of the sub-step 122, comprises the generation of a residual signal formed by subtracting from the additional data signal 130 with a motion-compensated logo prediction, a discrete cosine transform 218 ensuring a frequential conversion of said residual signal defined by Logo(n)−PRED(Logo(n−1),V(n)). This sub-step 218 relative to said residual signal treats a small number of blocks, because logo will usually occupy little space, its CPU occupation being then limited. Considering that the difference in complexity between a discrete cosine transform and an inverse discrete cosine transform is very small in terms of CPU consumption, the sub-step 217 has nearly the same complexity as the sub-step 216 and is applied to all blocks defining coding error pictures. As regards the partial decoding branch 219, no more IDCT are performed since data insertion is now done in the frequential domain. It is the same for the re-encoding branch, where no more DCT are performed since modified data are all in the frequential domain. Globally, these suppressions/insertions of DCT/IDCT sub-steps represent a significant gain of CPU capacity since the sub-steps 109 and 110 performed on entire pictures have been suppressed, and the sub-step 217 performed on entire pictures and the sub-step 218 only performed on a reduced number of blocks per pictures have been added. The proposed solution thus represents a cost-effective solution compared with the one of the prior art.

Figure 3:
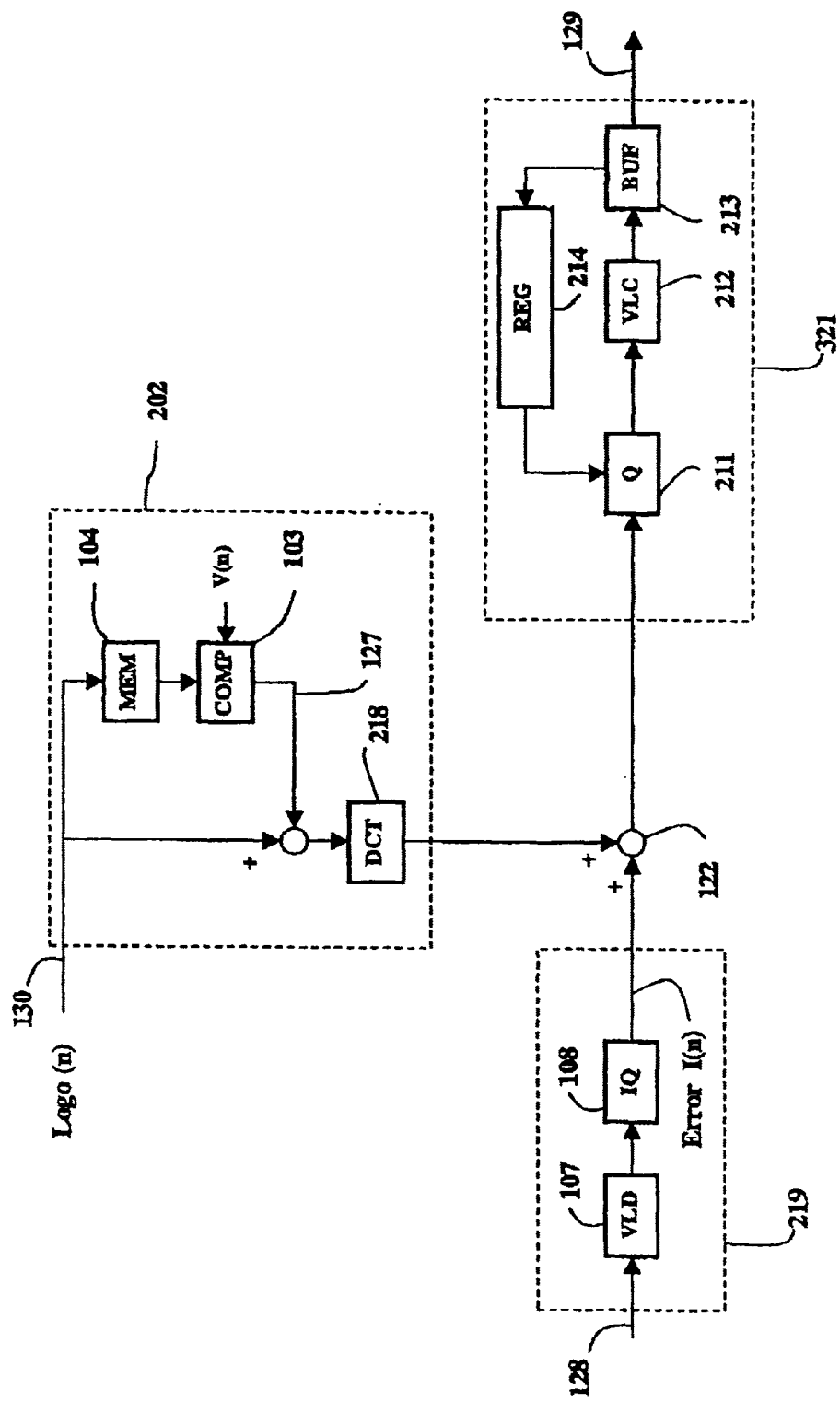
FIG. 3 illustrates a second embodiment of the technical solution according to the present invention.

FIG. 3, derived from FIG. 2, depicts another embodiment of the present invention. It is also based on a transcoder arrangement comprising a partial decoding branch for providing a decoded data signal, a re-encoding branch acting on a modified data signal for providing an output signal, and a data addition branch 202 aiming at introducing the additional data into the decoded data signal Error_I(n). The partial decoding branch, comprising a variable length decoding 107 and an inverse quantization sub-step 108, aims at decoding the input data signal 128 in order to access the decoded data signal Error_I(n), also called error residue relative to the input stream, in the frequential domain. This error residue is modified by frequential residual data issued from the addition branch 202 by means of the adding sub-step 122. Said frequential residual data results from the frequential conversion by means of the discrete cosine transform 218 applied to a residual signal formed by the difference between said additional data signal 130 and its motion-compensated version referenced 127 using the same motion vectors V(n) as the motion vectors contained in the input stream. This sub-step 218 treats a small number of blocks since logo usually occupies little space, its CPU consumption being then limited. The signal resulting from this addition, defining said modified data signal, between said frequential residual data and Error_I (n) is re-encoded by means of the re-encoding step 321 comprising in series a quantization 211, a variable length coding 212 and buffer regulations means 213–314. The absence of drift correction does not reduce the output stream quality to a large extent, since the input stream and data relative to logo have the same motion vector characteristics, as in the case with a fixed logo inserted into a still input video stream such as a still background. In this proposed arrangement, since no more drift correction is performed, a substantial gain in terms of CPU capacity is realized while ensuring a comparatively good video quality.

Figure 4:
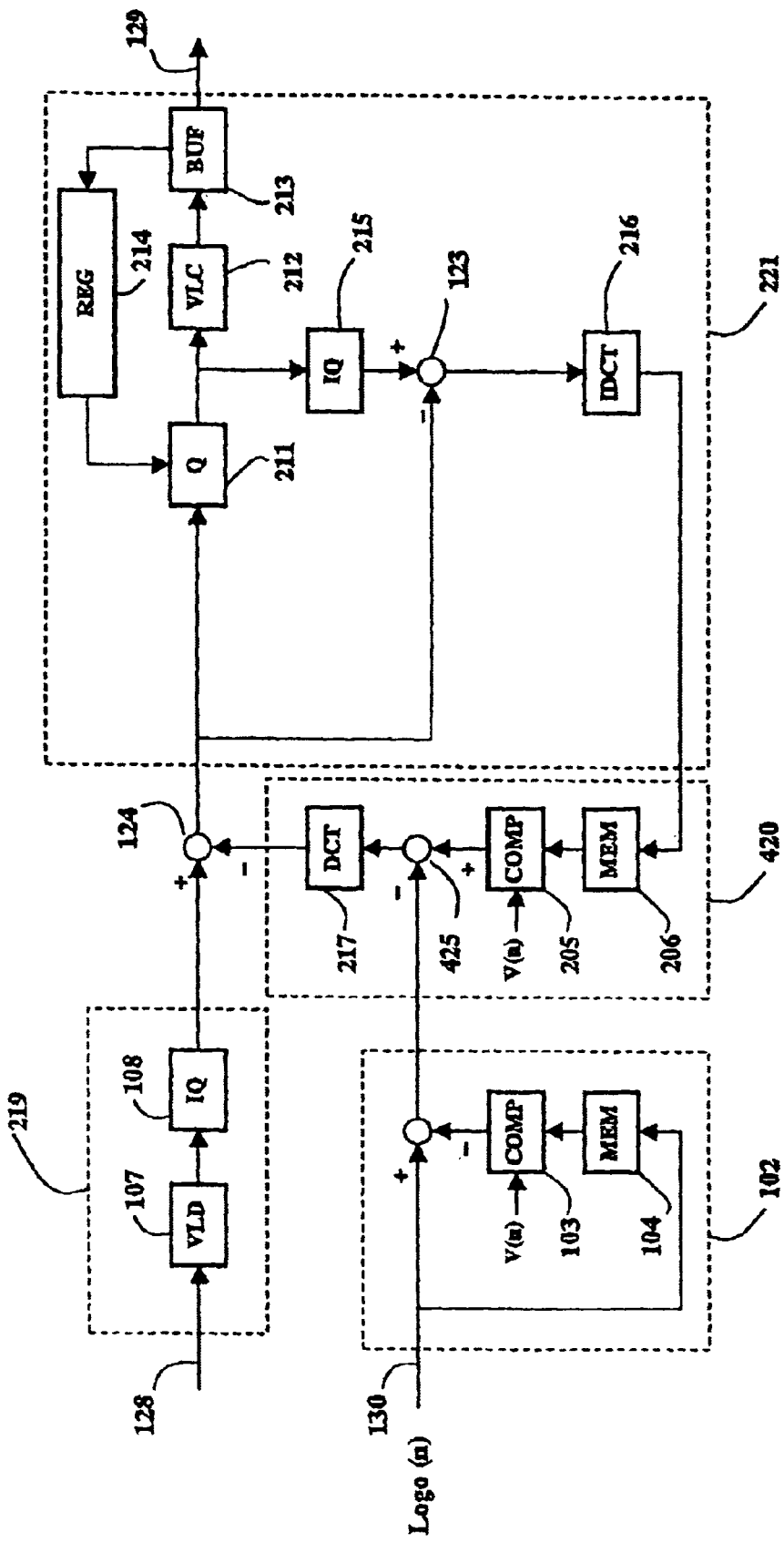
FIG. 4 illustrates a third embodiment of the technical solution according to the present invention.

FIG. 4, derived from FIG. 2, depicts another embodiment of the present invention. From an algorithmic point of view, starting from relation 0 relativing to the prior art and using the distributivity of DCT compared to addition/subtraction, it can be written:

$$A(n)=\text{Error}\_I(n)-\text{DCT}(\text{PRED}(\text{MEM3}(n-1), V(n))+\text{PRED}(\text{Logo}(n-1), V(n))-\text{Logo}(n))) \qquad 7)$$

With the following notations
  O3(n): decoded picture number n corresponding to the output signal of FIG. 4,
  I(n): decoded input picture number n,
  MEM3(n): picture number n stored in the frame memory 206, The corresponding diagram of FIG. 4 governed by relation 7) is close to the one of FIG. 2. It is also based on a transcoder arrangement comprising a partial decoding branch 219 for providing a decoded data signal, a re-encoding branch 221 acting on a modified data signal for providing an output signal, an intermediate branch 420 for avoiding a quality drift in time, and a data addition branch 102 for providing a residual signal resulting from the difference between said additional data signal 130 and its motion-compensated version. It differs at said data addition branch level in that it delivers said residual signal in said intermediate branch by means of a subtracting sub-step 425. Inserted between the motion compensation 205 and the discrete cosine transform 217 this subtracting sub-step delivers to sub-step 217, the difference between the motion-compensated coding error issued from sub-step 216 and said residual signal. Relation 7) demonstrates that only one DCT sub-step is needed to perform the data addition. That is done with the sub-step 217 ensuring the frequential conversion both for said residual signal and said motion-compensated coding error in one and the same operation, leading to a cost-effective solution in terms of CPU capacity.

This arrangement also preserves a high flexibility in its hardware implementation. Indeed, motion compensation 103 applied to said additional data signal and motion compensation 205 applied to said coding error may be performed by two separate digital signal processors adapted and optimized to characteristics of said residual signal and said coding error. First, considering that the signal contained in the picture memory 206 is defined by the relation O3(n)−I(n)−Logo(n) and that said signal is composed of values of small amplitude corresponding to the coding error generated by the re-encoding step, the motion compensation 205 can thus be done with a limited resolution, while ensuring a good quality as regards the drift correction. Typically, a 4-bits resolution may be used to obtain an acceptable quality, which offers the opportunity of implementation with a dedicated processor including 4-bit macro-instructions and requiring a little CPU occupation. As regards the motion compensation 103 performed on the signal 130 of greater amplitude, a higher resolution must be used to guarantee a good quality of areas corresponding to the logo. To this end, a generic digital processor may be used with a higher resolution, typically of 8 bits, only on blocks defining the logo area.

Figure 5:
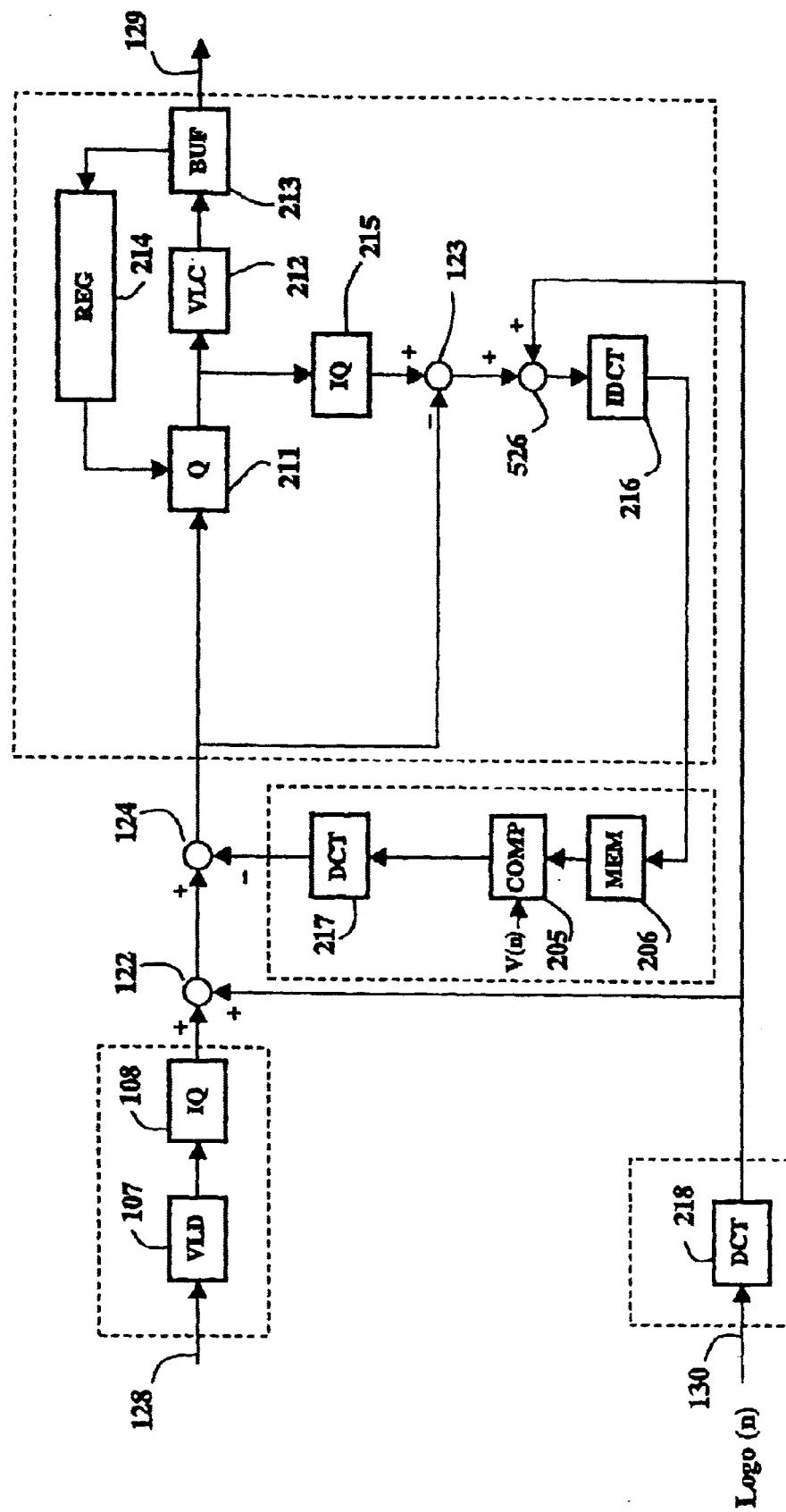
FIG. 5 illustrates a fourth embodiment of the technical solution according to the present invention.
Figure 6:
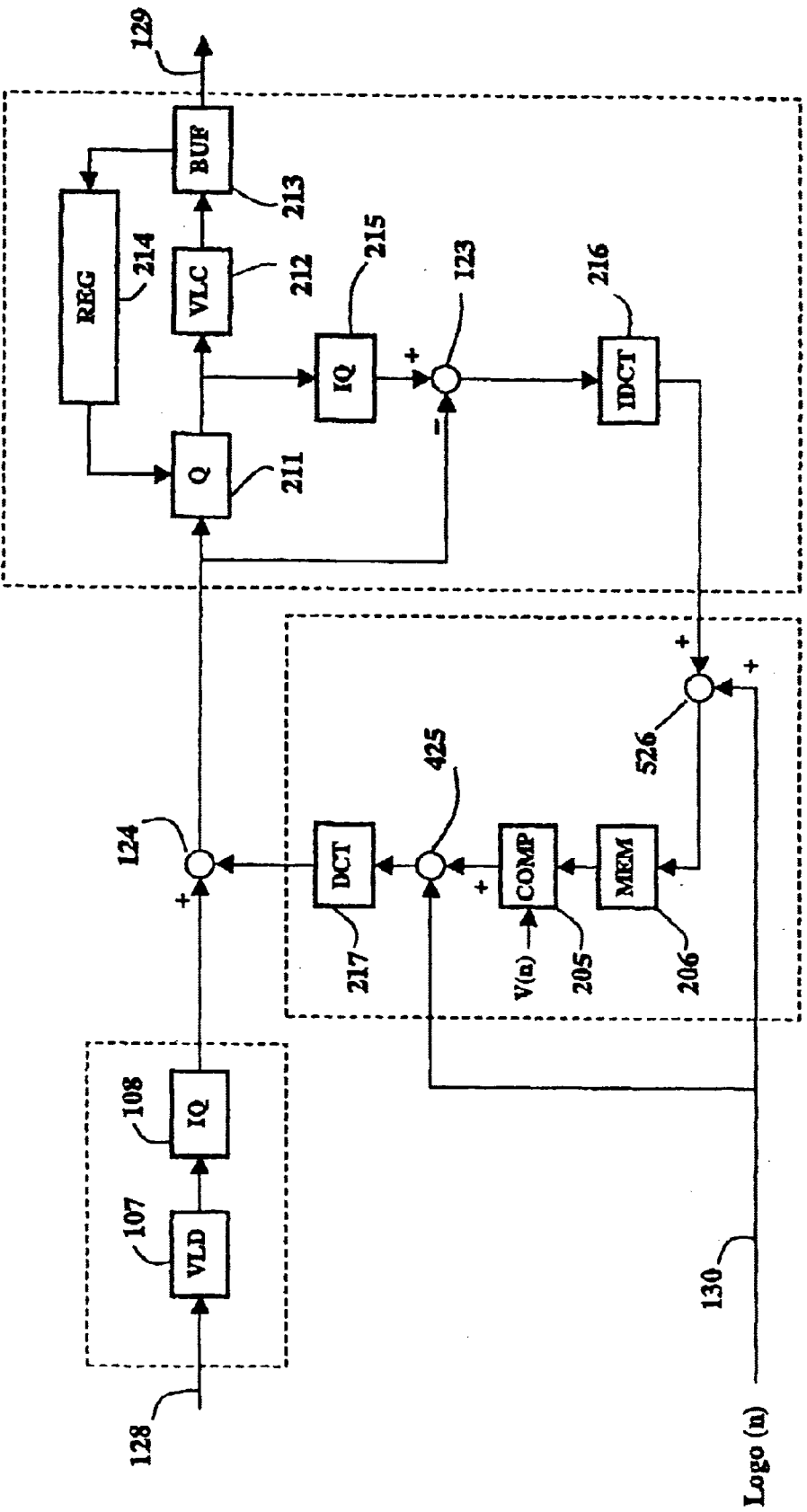
FIG. 6 illustrates a fifth embodiment of the technical solution according to the present invention.

FIG. 5 and FIG. 6, derived from FIG. 4, depict further embodiments of the present invention. They are also based on a transcoder arrangement comprising a partial decoding branch for providing a decoded data signal, a re-encoding branch acting on a modified data signal for providing an output signal, an intermediate branch for avoiding a quality drift in time, and a data addition branch. They differ at said data addition branch level in that no more motion compensation is performed on the additional data signal 130, thus offering a substantial gain in terms of CPU. It is indeed possible, from an algorithm point of view and without any quality loss, to use the motion compensation sub-step of the intermediate branch and dedicated to drift correction for said additional data signal by inserting a fraction of said additional data signal into the coding error generated by the re-encoding branch before motion compensation.

In FIG. 5, the data addition branch is only composed of a discrete cosine transform 218 applied to signal 130 and delivering a frequential additional data signal. This sub-step 218 processes only a small number of blocks corresponding to the logo, so its CPU occupation is limited. Said additional frequential data signal is simultaneously inserted into the decoded data signal by means of a first adding sub-step 122 and into the coding error issued from sub-step 123 by means of a second adding sub-step 526. Sub-step 122 delivers the sum of the decoded data signal issued from the partial decoding branch and said frequential additional data signal to the positive input of subtracting sub-step 124. Sub-step 526, at no cost for most digital signal processors, delivers to sub-step 216 the signal representing the sum of the coding error delivered by sub-step 123 and said frequential additional data signal.

In FIG. 6, the data insertion is performed by directly inserting said additional data signal 130 into the intermediate branch by means of sub-steps 425 and 526. No more frequential conversion is performed on said additional data signal, which represents a gain of CPU capacity. Sub-step 526, at no cost for most digital signal processors, delivers to picture memory 206 the signal resulting from the addition between the coding error issued from sub-step 216 and said additional data signal. Sub-step 425, at no cost for most digital signal processors, delivers to sub-step 217 the signal representing the difference between the motion-compensated coding error and said additional data signal. Contrary to the arrangement depicted in FIG. 4, which allows and justifies the use of a dedicated processor including macro-instructions for motion compensation performed on the coding error, it is not possible to do the same with the arrangements of FIG. 5 and FIG. 6 since the motion compensation 205 is performed on the coding error defined by the relation O(n)−I(n), O(n) defining any one of the decoded picture number n which corresponds to the output signal in FIG. 5 or FIG. 6. Indeed, the amplitude of this signal being approximately that of the signal relative to additional data signal 130, a high resolution motion compensation is required to ensure a good quality of the inserted data, which excludes the use of a specific processor dedicated to low resolution signals. However, FIG. 5 and FIG. 6 represent an appreciable improvement in terms of gain of CPU capacity over the prior art.

Figure 7:
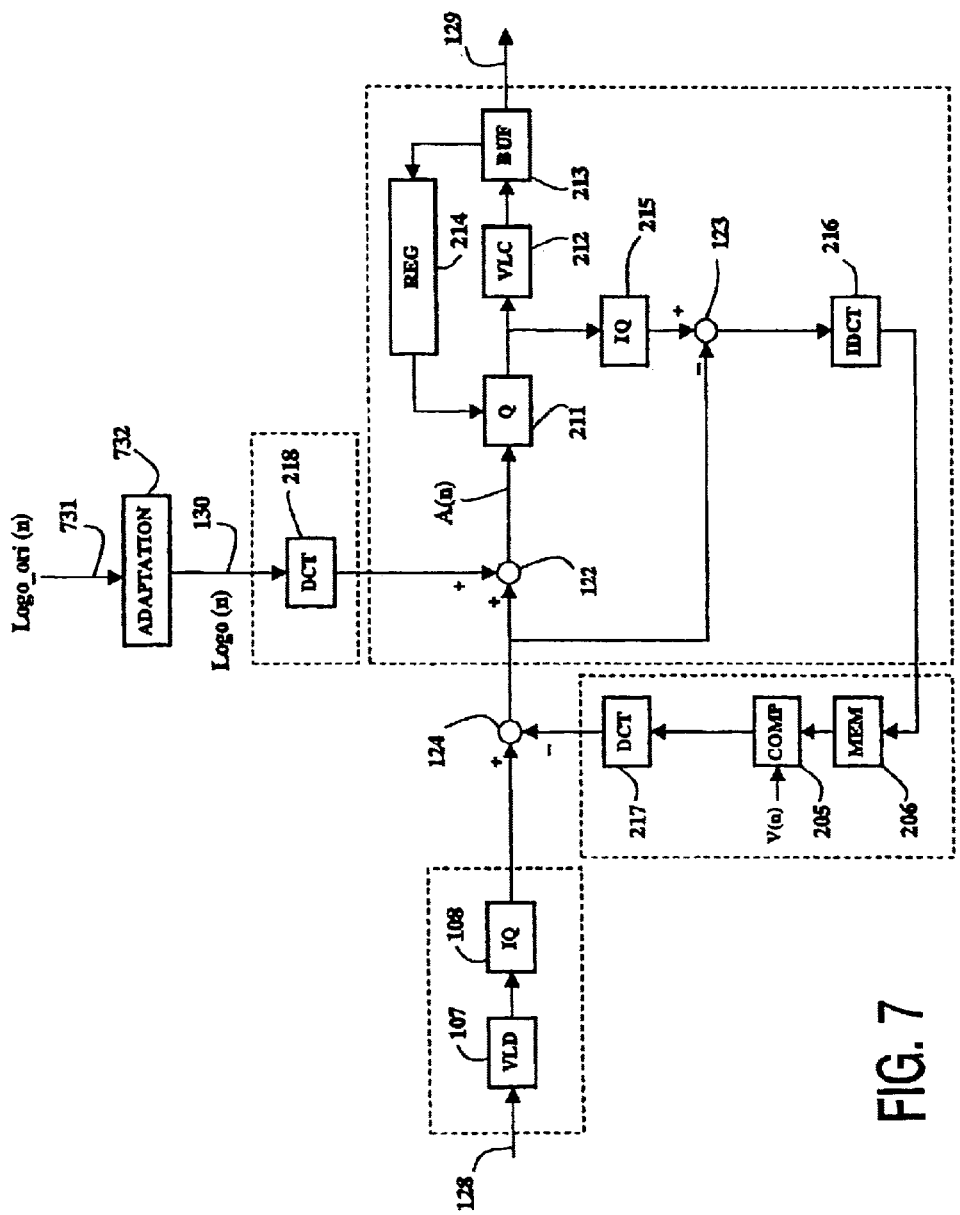
FIG. 7 illustrates a sixth embodiment of the technical solution according to the present invention.

FIG. 7, derived from FIG. 5 and FIG. 6, depicts another embodiment of the present invention. It is also based on a transcoder arrangement comprising a partial decoding branch for providing a decoded data signal, a re-encoding branch acting on a modified data signal for providing an output signal, an intermediate branch for avoiding a quality drift in time, and a data addition branch. It differs at said data addition branch level, which allows the modification of the input signal by the insertion of a frequential additional data, in that it has only one adding sub-step 122.

From an algorithmic point of view, the arrangement depicted in FIG. 7 according to the invention is equivalent to the one described in the prior art of FIG. 1. Indeed, the relation A(n)=B(n) being verified, the relation BUF(VLC(Q(A(n))))=BUF(VLC(Q(B(n)))) is also verified, which implies that the same output stream will be obtained, BUF−VLC−Q corresponding to operations performed by respective sub-steps 111/211−112/212−113/213.

This proposed arrangement allows that no more separate motion compensation and its associated memory for the signal 130 are used, since said data can be directly inserted into the intermediate branch, this simplification being justified by the linearity of the motion compensation. This merging of the two motion compensations—if the insertion of the adding sub-step 122, at no cost for most digital signal processors, is excluded—represents a substantial gain in terms of CPU occupation and also memory storage. The input signal is then modified by only two sub-steps. The first one corresponds to the discrete cosine transform 218 only applied to the additional data signal 130 and providing a frequential additional data signal, this operation being performed only on the few blocks defining the logo area and being thus a low CPU burden. The second one corresponds to the adding sub-step 122 delivering said modified data signal to the re-encoding branch, said modified data signal resulting from the addition of said frequential additional data signal and the output signal of sub-step 124. This arrangement allows a data modification in a cost-effective manner because these two sub-steps relative to data insertion.

In FIG. 2 to FIG. 7 described above according to the invention, the input signal data is modified through to the insertion of pixel-based data, designated as the additional data signal 130, by means of adding sub-steps. These inserted data may correspond to a logo, i.e. a single small picture, or a ticker, i.e. successive small different pictures. In both cases, each picture must be pixel-based, e.g. in being encoded according to the so-called bitmap format which corresponds to a rough digital image coding. Of course, before insertion by means of the adding or subtracting sub-steps, said signal 130 may derive from an adapted data signal Logo_ori(n), referenced as 731, in order to optimize the quality of the output signal, as it is only represented in FIG. 7 with step 732, for example by changing the luminance or the chrominance levels, as far as their format is still compatible. It is obvious that such an adaptation does not restrict the scope and the degree of protection of the present invention.

This method of modifying data in an encoded data signal can be implemented in several manners, such as by means of wired electronic circuits or, alternatively, by means of a set of instructions stored in a computer-readable medium, said instructions replacing at least a portion of said circuits and being executable under the control of a computer or a digital processor in order to carry out the same functions as fulfilled in said replaced circuits. The invention then also relates to a computer-readable medium comprising a software module which includes computer executable instructions for performing the steps, or some steps, of the method described above.

What is claimed is:

1. A method of modifying data in an encoded data signal comprising:
    a) a decoding step for decoding said encoded data signal and providing a decoded data signal,
    b) a re-encoding step performed on a modified data signal,
    c) a step for providing a pixel-based residual signal, which results from a difference between a predicted signal of an additional data signal and said additional data signal, characterized in that the method further comprises:
    d) a conversion step for providing a frequential residual signal resulting from a frequential conversion of said pixel-based residual signal,
    e) a sub-step for adding said frequential residual signal to said decoded data signal, so as to provide said modified data signal.

2. A method as claimed in claim 1, in which an intermediate step is inserted between said decoding and re-encoding steps, comprising at least a step for providing a motion-compensated signal from a coding error generated by said re-encoding step, characterized in that said motion-compensated signal is subtracted from said modified data signal before said re-encoding step.

3. A computer program product for a transcoding device for adding data to an encoded data signal, which product comprises a set of instructions which, when loaded into said device, causes said device to carry out the method as claimed in claim 1.

4. A transcoding device for adding data to an encoded data signal, comprising:
    a) decoding means for decoding said encoded data signal and providing a decoded data signal,
    b) re-encoding means for re-encoding a modified data signal,
    c) means for providing a pixel-based residual signal, which results from the difference between a predicted signal of an additional data signal and said additional data signal,
characterized in that the device further comprises:
    d) conversion means for providing a frequential residual signal resulting from a frequential conversion of said pixel-based residual signal,
    e) means for adding said frequential residual signal to said decoded data signal, so as to provide said modified data signal.

* * * * *